(12) United States Patent
Akagawa et al.

(10) Patent No.: US 12,066,753 B2
(45) Date of Patent: Aug. 20, 2024

(54) LIGHT SOURCE APPARATUS AND PROJECTOR

(71) Applicant: SEIKO EPSON CORPORATION, Tokyo (JP)

(72) Inventors: Tomoko Akagawa, Matsumoto (JP); Tetsuo Shimizu, Matsumoto (JP); Shoichi Uchiyama, Shimosuwa-machi (JP); Chigusa Takagi, Azumino (JP); Ryota Tatsumi, Chino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 18/191,058

(22) Filed: Mar. 28, 2023

(65) Prior Publication Data

US 2023/0305377 A1     Sep. 28, 2023

(30) Foreign Application Priority Data

Mar. 28, 2022 (JP) ................................. 2022-052360

(51) Int. Cl.
G03B 21/20         (2006.01)
(52) U.S. Cl.
CPC .................................. G03B 21/204 (2013.01)
(58) Field of Classification Search
CPC .................................................. G03B 21/204
See application file for complete search history.

(56) References Cited

FOREIGN PATENT DOCUMENTS

| JP | 2012054272 A | 3/2012 | | |
|---|---|---|---|---|
| JP | 2015022954 A | 2/2015 | | |
| JP | 2015022955 A | * | 2/2015 | ............... F21S 2/00 |
| JP | 2015022955 A | 2/2015 | | |
| JP | 2021106299 A | 7/2021 | | |

OTHER PUBLICATIONS

English Machine Translation of Hirano, JP 20150022955 (Year: 2023).*

* cited by examiner

Primary Examiner — Donald L Raleigh
(74) Attorney, Agent, or Firm — Dority & Manning, P.A.

(57) ABSTRACT

A light source apparatus includes a first laser light emitter that emits first light, a wavelength converter that converts the first light into second light, a base including a first support part that supports the first laser light emitter and a second support part that supports the wavelength converter, and a first optical element that guides the first light to the wavelength converter. The first optical element has a first light incident surface which faces the first laser light emitter, a first reflection surface that reflects the first light emitted from the first light incident surface and deflects the optical path of the first light, and a first light exiting surface which faces the wavelength converter and via which the first light reflected off the first reflection surface exits. The first light incident surface, the first reflection surface, and the first light exiting surface intersect with each other.

18 Claims, 6 Drawing Sheets

LIGHT SOURCE APPARATUS AND PROJECTOR

The present application is based on, and claims priority from JP Application Serial Number 2022-052360, filed Mar. 28, 2022, the disclosure of which is hereby incorporated by reference herein in its entirety.

BACKGROUND

1. Technical Field

The present disclosure relates to a light source apparatus and a projector.

2. Related Art

JP-A-2012-054272 discloses a light source apparatus which includes a phosphor and excitation light sources provided at a support surface of a substrate and in which excitation light outputted from the excitation light sources in parallel to the support surface is caused to be incident on the phosphor, and fluorescence emitted from the phosphor is extracted via a light transmissive window.

In the light source apparatus described above, the phosphor is excited by the excitation light outputted from the excitation light sources along the support surface of the base, so that the excitation light cannot be efficiently incident on the phosphor, resulting in a problem of a decrease in fluorescence conversion efficiency and hence insufficient brightness of the generated fluorescence.

SUMMARY

To solve the problem described above, a light source apparatus according to an aspect of the present disclosure includes a first laser light emitter configured to emit first light having a first wavelength band, a wavelength converter configured to convert the first light into second light having a second wavelength band different from the first wavelength band, a base including a first support part that supports the first laser light emitter and a second support part that supports the wavelength converter, and a first optical element disposed in an optical path of the first light between the first laser light emitter and the wavelength converter and configured to guide the first light emitted from the first laser light emitter to the wavelength converter. The first optical element has a first light incident surface which faces the first laser light emitter and on which the first light emitted from the first laser light emitter is incident, a first reflection surface configured to reflect the first light emitted from the first light incident surface and deflect the optical path of the first light, and a first light exiting surface which faces the wavelength converter and via which the first light reflected off the first reflection surface exits toward the wavelength converter. The first light incident surface, the first reflection surface, and the first light exiting surface intersect with each other.

A projector according to another aspect of the present disclosure includes the light source apparatus described above, a light modulator configured to modulate light emitted from the light source apparatus, and a projection optical apparatus configured to project the light modulated by the light modulator.

DESCRIPTION OF EXEMPLARY EMBODIMENTS

Figure 1:
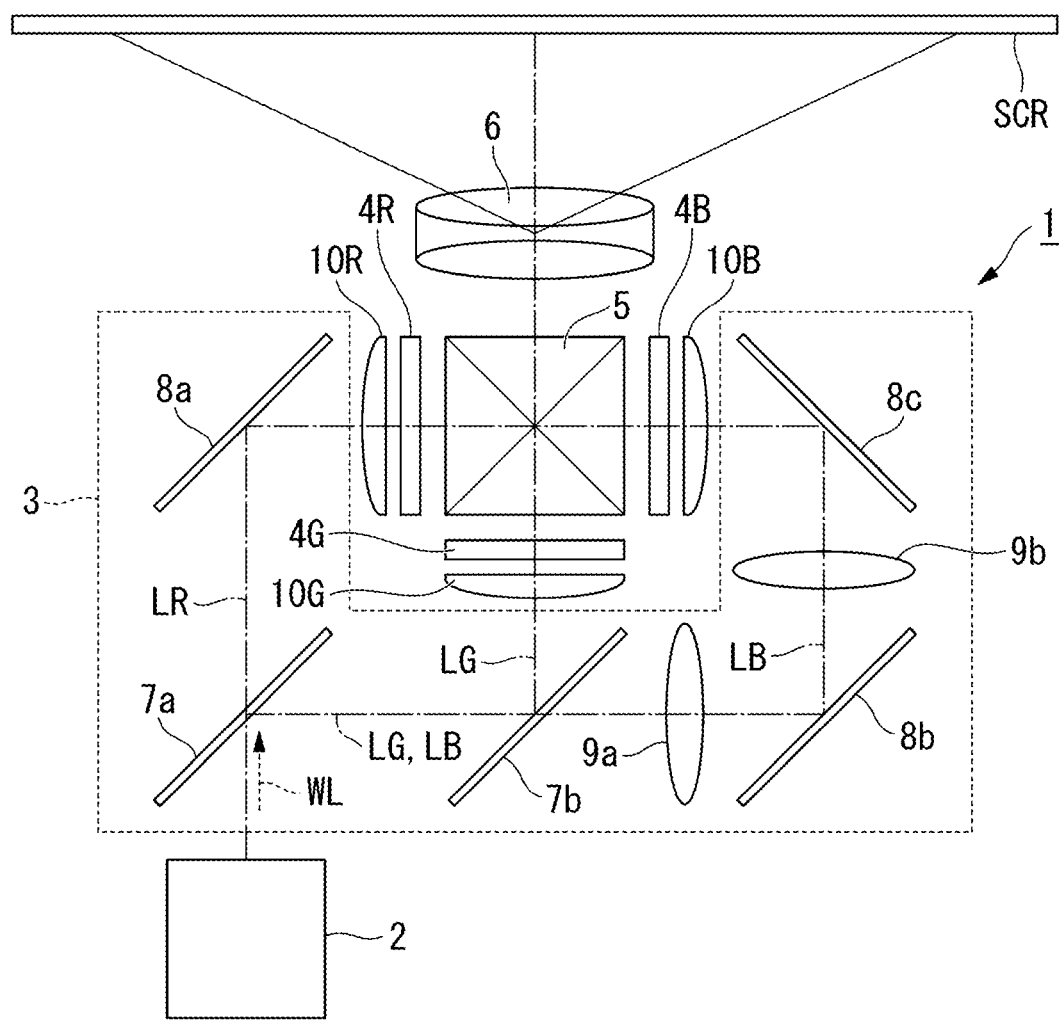
FIG. 1 shows a schematic configuration of a projector according to an embodiment.

An embodiment of the present disclosure will be described below in detail with reference to the drawings.

In the drawings used in the description below, a characteristic portion is enlarged for convenience in some cases for clarity of the characteristic thereof, and the dimension ratio and other factors of each component are therefore not always equal to actual values.

An example of a projector according to the present embodiment will be described.

FIG. 1 shows a schematic configuration of the projector according to the present embodiment.

A projector 1 according to the present embodiment is a projection-type image display apparatus that displays color video images on a screen SCR, as shown in FIG. 1. The projector 1 includes a color separation system 3, light modulators 4R, 4G, and 4B, a light combining system 5, a projection optical apparatus 6, and an illuminator 2.

The color separation system 3 separates white illumination light WL from the illuminator 2 into red light LR, green light LG, and blue light LB. The color separation system 3 includes a first dichroic mirror 7a, a second dichroic mirror 7b, a first reflection mirror 8a, a second reflection mirror 8b, a third reflection mirror 8c, a first relay lens 9a, and a second relay lens 9b.

The first dichroic mirror 7a separates the illumination light WL from the illuminator 2 into the red light LR and the other light formed of the green light LG and the blue light LB. The first dichroic mirror 7a transmits the separated red light LR and reflects the separated other light. The second dichroic mirror 7b reflects the green light LG and transmits the blue light LB.

The first reflection mirror 8a reflects the red light LR toward the light modulator 4R. The second reflection mirror 8b and the third reflection mirror 8c guide the blue light LB to the light modulator 4B. The green light LG is reflected off the second dichroic mirror 7b toward the light modulator 4G.

The first relay lens 9a is disposed in the optical path of the blue light LB at the downstream of the second dichroic mirror 7b. The second relay lens 9b is disposed in the optical path of the blue light LB at the downstream of the second reflection mirror 8b.

The light modulator 4R modulates the red light LR in accordance with image information to form image light corresponding to the red light LR. The light modulator 4G modulates the green light LG in accordance with image information to form image light corresponding to the green light LG. The light modulator 4B modulates the blue light LB in accordance with image information to form image light corresponding to the blue light LB.

The light modulators 4R, 4G, and 4B are each, for example, a transmissive liquid crystal panel. Polarizers that are not shown are disposed at the light incident side and the light exiting side of each of the liquid crystal panels and configured to transmit only linearly polarized light polarized in a specific direction.

Field lenses 10R, 10G, and 10B are disposed at the light incident side of the light modulators 4R, 4G, and 4B, respectively. The field lenses 10R, 10G, and 10B parallelize the light fluxes of the red light LR, the green light LG, and the blue light LB to be incident on the respective light modulators 4R, 4G, and 4B.

The light combining system 5 receives the image light outputted from the light modulators 4R, 4G, and 4B, combines the image light corresponding to the red light LR, the image light corresponding to the green light LG, and the image light corresponding to the blue light LB with one another, and outputs the combined image light toward the projection optical apparatus 6. The light combining system 5 is, for example, a cross dichroic prism.

The projection optical apparatus 6 is formed of a plurality of lenses. The projection optical apparatus 6 enlarges the combined image light from the light combining system 5 and projects the enlarged image light toward the screen SCR. An image is thus displayed on the screen SCR.

Figure 2:
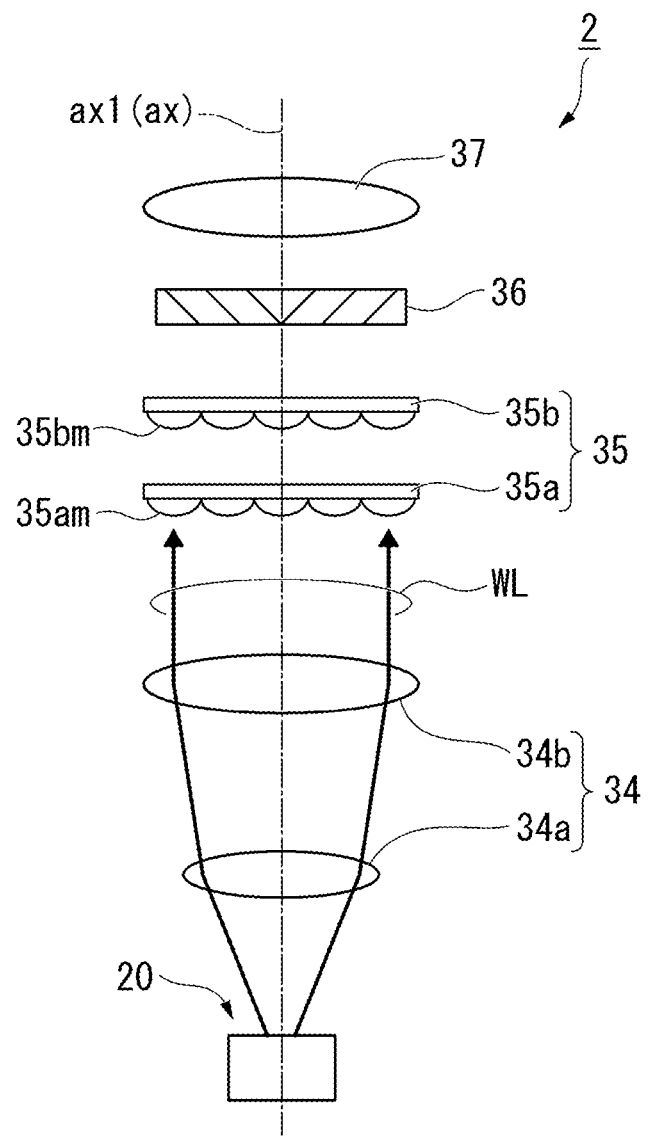
FIG. 2 is a schematic configuration diagram of an illuminator.

FIG. 2 is a schematic configuration diagram of the illuminator 2.

The illuminator 2 includes a light source apparatus 20, a pickup system 34, an optical integration system 35, a polarization converter 36, and a superimposing lens 37, as shown in FIG. 2.

The light source apparatus 20 outputs the white illumination light WL toward the pickup system 34.

The illumination light WL parallelized by the pickup system 34 enters the optical integration system 35. The optical integration system 35 is formed, for example, of a first lens array 35a and a second lens array 35b.

The first lens array 35a includes a plurality of first lenslets 35am, and the second lens array 35b includes a plurality of second lenslets 35bm.

The first lens array 35a separates the illumination light WL into a plurality of thin pencils of light. The first lenslets 35am bring the thin pencils of light into focus at the corresponding second lenslets 35bm. The optical integration system 35 cooperates with the superimposing lens 37, which will be described later, to homogenize the illuminance distribution in image formation regions of the light modulators 4R, 4G, and 4B shown in FIG. 1, which are illumination receiving regions.

The illumination light WL having passed through the optical integration system 35 enters the polarization converter 36. The polarization converter 36 is formed, for example, of polarization separation films and retardation films (half-wave plates). The polarization converter 36 converts the polarization directions of fluorescence YL into the polarization direction of one of the polarized components.

The illumination light WL having passed through the polarization converter 36 enters the superimposing lens 37. The illumination light WL having exited out of the superimposing lens 37 enters the color separation system 3. The superimposing lens 37 superimposes the plurality of thin pencils of light described above, which form the illumination light WL, on one another in the illumination receiving regions, that is, the image formation regions of the light modulators 4R and 4G so that the regions are uniformly illuminated.

The configuration of the light source apparatus 20 will be described below in detail.

Figure 3:
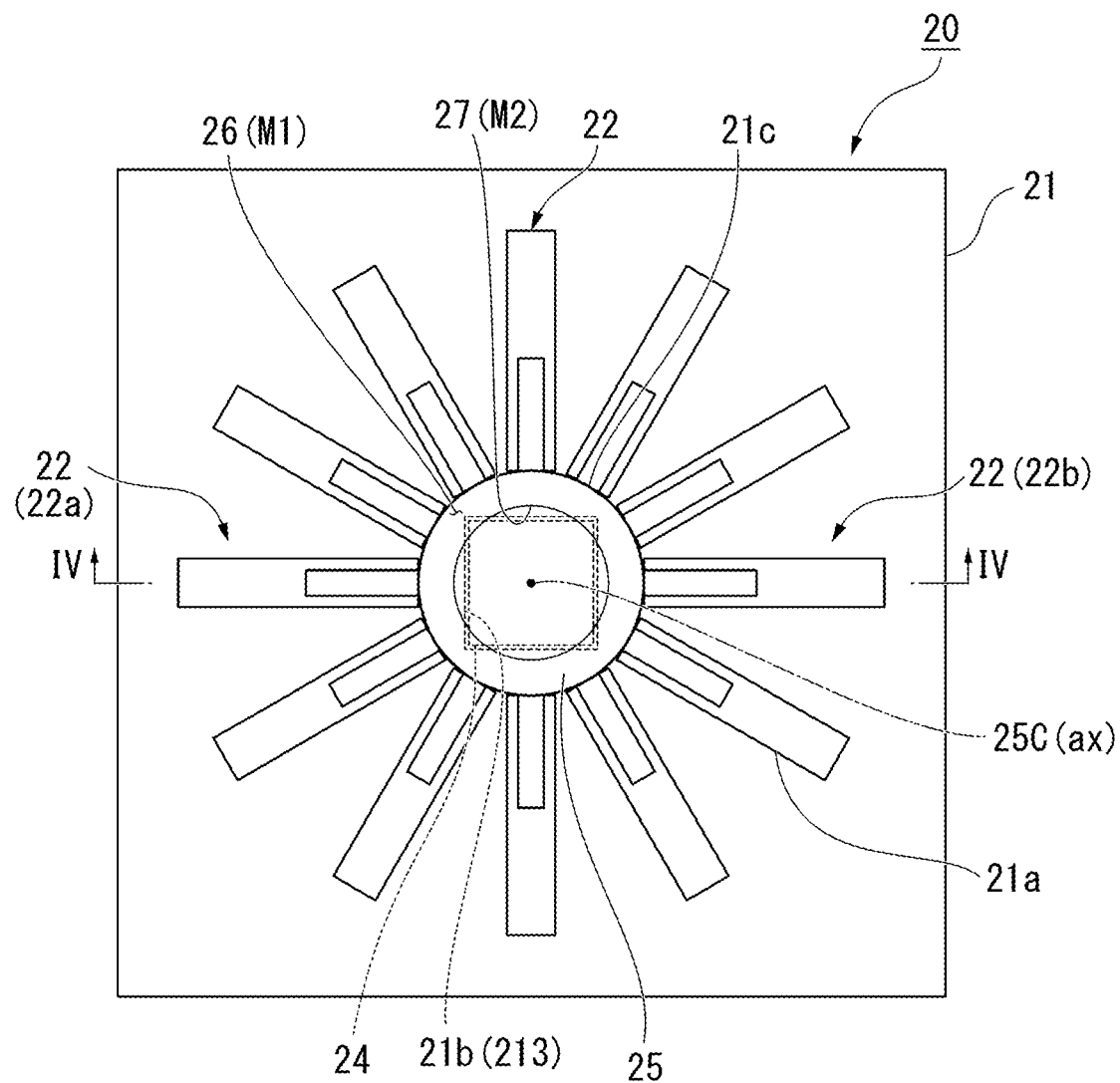
FIG. 3 is a plan view of a light source apparatus.

FIG. 3 is a plan view of the light source apparatus 20. FIG. 3 shows the light source apparatus 20 viewed in the direction along an optical axis ax (axis-Z direction). In the drawings described below, each configuration of the light source apparatus 20 will be described by using an XYZ coordinate system as required. The axis Z is an axis parallel to the optical axis ax of the light source apparatus 20, the axis X is an axis perpendicular to the optical axis ax and parallel to a normal to a base 21, which constitutes the light source apparatus 20. The axes Y and Z are axes perpendicular to each other and the axis X. The optical axis ax of the light source apparatus 20 coincides with an illumination optical axis ax1 of the illuminator 2 shown in FIG. 2.

The light source apparatus 20 includes the base 21, a plurality of laser light emitters 22, a wavelength converter 24, a prism member 25, and a reflector 30 (see FIG. 4, which will be described later), as shown in FIG. 3.

The base 21 supports the plurality of laser light emitters 22 and the wavelength converter 24. The base 21 is, for example, a plate made of metal that excels in heat dissipation capability, such as aluminum and copper.

In the plan view viewed in the axis-Z direction along the optical axis ax (hereinafter referred simply to as "plan view"), the plurality of laser light emitters 22 are disposed around the prism member 25. The plurality of laser light emitters 22 are disposed around the prism member 25 so as to extend radially. The plurality of laser light emitters 22 are so disposed that each pair of laser light emitters face each other with the optical axis ax sandwiched therebetween.

In the present embodiment, the plurality of laser light emitters 22 include a first laser light emitter 22a and a second laser light emitter 22b. The first laser light emitter 22a and the second laser light emitter 22b are disposed on the base 21 so as to face each other with the optical axis ax sandwiched therebetween. The first laser light emitter 22a is disposed at a position shifted toward the side −Y from the optical axis ax, and the second laser light emitter 22b is disposed at a position shifted toward the side +Y from the optical axis ax.

Figure 4:
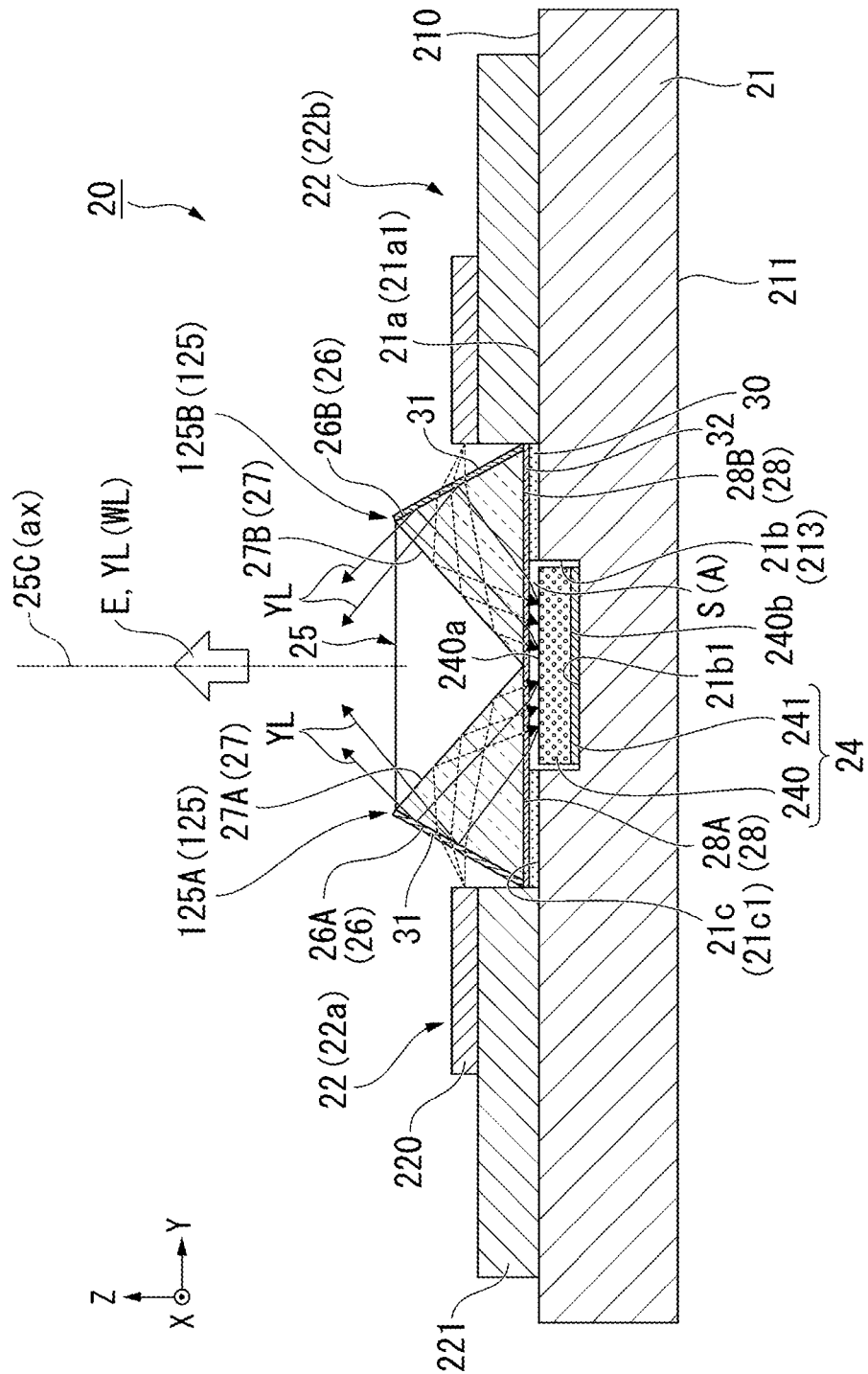
FIG. 4 shows a cross section viewed in the direction of the arrows indicated by the line IV-IV in FIG. 3.

FIG. 4 is a cross-sectional view of the light source apparatus 20. FIG. 4 shows a cross section viewed in the direction of the arrows indicated by the line IV-IV in FIG. 3 and is a cross-sectional view of the light source apparatus 20 taken along a plane including the optical axis ax and perpendicular to the plane XY. Note that FIG. 4 is a cross-sectional view showing the first laser light emitter 22a and the second laser light emitter 22b out of the plurality of laser light emitters 22.

The base 21 is a plate having a front surface 210 and a rear surface 211, and the front surface 210 supports the plurality of laser light emitters 22, the wavelength converter 24, and the prism member 25. The base 21 includes a first support part 21a, which supports the plurality of laser light emitters 22, a second support part 21b, which supports the wavelength converter 24, a third support part 21c, which supports the prism member 25, and a recess 213, which houses the wavelength converter 24.

The base 21 functions as a heat dissipation member that dissipates heat of the plurality of laser light emitters 22, the wavelength converter 24, and the prism member 25.

The third support part 21c is provided at the center of the front surface 210 of the base 21. The first support part 21a is provided at a portion, of the front surface 210 of the base 21, that is around the third support part 21c.

The second support part 21b is provided at a position where the second support part 21b overlaps with the third support part 21c in the plan view, as shown in FIG. 3. The second support part 21b is the recess 213, which houses the wavelength converter 24. That is, the recess 213 is formed at a position, in the base 21, where the recess 213 overlaps with a portion of the third support part 21c in the plan view.

The first support part 21a has a first support surface 21a1, which supports the plurality of laser light emitters 22. The third support part 21c has a third support surface 21c1, which supports the prism member 25. In the present embodiment, the first support surface 21a1 and the third support surface 21c1 are each formed of a portion of the front surface 210 of the base 21. That is, the first support surface 21a1 and the third support surface 21c1 are flush with each other. The first support surface 21a1 and the third support surface 21c1 may not be flush with each other in the axis-Z direction. For example, the third support surface 21c1 may be recessed with respect to the first support surface 21a1. In this case, the prism member 25 is readily disposed at the third support surface 21c1, which is recessed with respect to the first support surface 21a1.

In the present embodiment, the first support surface 21a1, which supports the laser light emitters 22, is formed of a flat surface, so that the process of implementing the laser light emitters 22 at the base 21 is simplified. The laser light emitters 22 can thus be precisely implemented at the base 21, whereby excitation light E outputted from the laser light emitters 22 is readily positioned with respect to the prism member 25. Irradiation spots of the excitation light E can therefore be formed on the wavelength converter 24 with increased positional accuracy.

The second support part 21b has a second support surface 21b1, which supports the wavelength converter 24. The second support surface 21b1 is the bottom surface of the recess 213 formed at the front surface 210 of the base 21. The second support surface 21b1 is therefore located at a position shifted toward the rear surface 211 across the base 21 from the first support surface 21a1 and the third support surface 21c1. That is, the second support surface 21b1 is a surface recessed with respect to the front surface 210 of the base 21.

In the present embodiment, the prism member 25 is fixed to the third support part 21c via the reflector 30. The reflector 30 reflects the excitation light E and the fluorescence YL, the latter of which will be described later, and is formed, for example, of an Ag paste film. The reflector 30 is provided in the region, of a first light exiting surface 28A, that does not face the wavelength converter 24.

In the present embodiment, a gap S is provided between the wavelength converter 24 supported by the second support part 21b and the prism member 25 supported by the third support part 21c. That is, the wavelength converter 24 and the prism member 25 are not in contact with each other, and an air layer A is provided in the gap S between the wavelength converter 24 and the prism member 25.

The configuration of the laser light emitters 22 will be subsequently described. The laser light emitters 22 have the same configuration.

The laser light emitters 22 each include a light emitting part 220 and a sub-mount 221. The light emitting part 220 emits the excitation light (first light) E having a first wavelength band. The first wavelength band is, for example, a blue-violet wavelength band ranging from 400 to 480 nm and has a peak wavelength of, for example, 455 nm.

The sub-mount 221 is made, for example, of a ceramic material, such as aluminum nitride and alumina. The sub-mount 221 mitigates thermal stress induced by the difference in the coefficient of linear expansion between the base 21 and the light emitting part 220. The sub-mount 221 is bonded to the first support part 21a of base 21 via a bonding material, such as silver graze and gold-tin solder.

The laser light emitters 22 are supported by the first support part 21a of the base 21 so as to output the excitation light E along the front surface 210 of the base 21. The excitation light E outputted from the laser light emitters 22 enters the prism member 25.

The prism member 25 is disposed in the optical path of the excitation light E between each of the laser light emitters 22 and the wavelength converter 24, and guides the excitation light E outputted from the laser light emitter 22 to the wavelength converter 24.

The wavelength converter 24 includes a wavelength conversion layer 240 and a reflection layer 241 provided on the side across the wavelength conversion layer 240 from the prism member 25. The wavelength conversion layer 240 has a front surface 240a and a rear surface 240b. The reflection layer 241 is provided at the rear surface 240b of the wavelength conversion layer 240.

The wavelength conversion layer 240 contains a phosphor that converts the excitation light E into the fluorescence (second light) YL, which has a second wavelength band different from the first wavelength band. The second wavelength band is, for example, a yellow wavelength band ranging from 550 to 640 nm. The phosphor can, for example, be an yttrium-aluminum-garnet-based (YAG-based) phosphor. The phosphor may be made of one type of material, or a mixture of particles made of two or more materials may be used as the phosphor.

The front surface 240a of the wavelength conversion layer 240 corresponds to a light incident surface of the wavelength converter 24. The wavelength conversion layer 240 outputs the fluorescence YL, into which is the excitation light E incident via the front surface 240a of the wavelength conversion layer 240 is converted in terms of wavelength, via the front surface 240a. Part of the excitation light E is scattered at the front surface 240a of the wavelength conversion layer 240 or inside the wavelength conversion layer 240 and exits via the front surface 240a without being converted into the fluorescence YL. The front surface 240a of the wavelength conversion layer 240 therefore corresponds also to a light exiting surface of the wavelength converter 24.

Part of the fluorescence YL travels toward the rear surface 240b of the wavelength conversion layer 240. In the present embodiment, the reflection layer 241 provided at the rear surface 240b of the wavelength conversion layer 240 can reflect the fluorescence YL toward the front surface 240a.

The wavelength converter 24 in the present embodiment is a reflective wavelength converter that causes the fluorescence YL to exit via the front surface 240a, on which the excitation light E is incident.

The prism member 25 has a circular outer shape and has the external appearance of a truncated cone with a conical portion removed from the upper surface the truncated cone, as shown in FIG. 3. The prism member 25 is made, for example, of optical glass, such as quartz and BK7. A center axis 25C of the prism member 25 coincides with the optical axis ax of the light source apparatus 20.

The prism member 25 is supported by the third support part 21c of the base 21 so as to cover an upper side of the wavelength converter 24 disposed in the recess 213 of the base 21, as shown in FIG. 4.

The prism member 25 has a light incidence surface (first surface) 26, a reflection surface (second surface) 27, a light exiting surface (third surface) 28, a first optical layer 31, and a second optical layer 32. The light incident surface 26, the reflection surface 27, and the light exiting surface 28 are surfaces that intersect with each other.

The light incident surface 26 includes a first conical surface M1 having a vertex on the side across the prism member 25 from the wavelength converter 24 (side +Z), as shown in FIG. 3. The light incident surface 26 is a surface which faces the laser light emitters 22 and on which the excitation light E outputted from the laser light emitters 22 is incident.

The reflection surface 27 includes a second conical surface M2, which is located inside the first conical surface M1 and has a vertex at the side facing the base 21, as shown in FIG. 3. The reflection surface 27 is a surface that reflects the excitation light E incident via the light incident surface 26 and deflects the optical path of the excitation light E toward the wavelength converter 24.

The light exiting surface 28 is a surface which faces the wavelength converter 24 and via which the excitation light E reflected off the reflection surface 27 exits toward the wavelength converter 24.

The prism member 25 in the present embodiment is formed of a plurality of portions 125 corresponding to the plurality of respective laser light emitters 22. In the present embodiment, the portions 125 are integrated into a single portion. That is, the prism member 25 in the present embodiment is a single prism member.

The plurality of portions 125 include a first portion (first optical element) 125A corresponding to the first laser light emitter 22a and a second portion (second optical element) 125B corresponding to the second laser light emitter 22b.

The first portion 125A has a first light incident surface 26A, a first reflection surface 27A, and a first light exiting surface 28A. The first light incident surface 26A is a surface which faces the first laser light emitter 22a and on which the excitation light E outputted from the first laser light emitter 22a is incident. The first reflection surface 27A is a surface that reflects the excitation light E incident via the first light incident surface 26A and deflects the optical path of the excitation light E. The first light exiting surface 28A is a surface which faces the wavelength converter 24 and via which the excitation light E reflected off the first reflection surface 27A exits toward the wavelength converter 24.

The second portion 125B has a second light incident surface 26B, a second reflection surface 27B, and a second light exiting surface 28B. The second light incident surface 26B is a surface which faces the second laser light emitter 22b and on which the excitation light E outputted from the second laser light emitter 22b is incident. The second reflection surface 27B is a surface that reflects the excitation light E incident via the second light incident surface 26B and deflects the optical path of the excitation light E. The second light exiting surface 28B is a surface which faces the wavelength converter 24 and via which the excitation light E reflected off the second reflection surface 27B exits toward the wavelength converter 24.

In the present embodiment, the first portion 125A and the second portion 125B are integrated with each other, as described above. Therefore, the first light incident surface 26A and the second light incident surface 26B are each formed of a portion of the light incident surface 26, the first reflection surface 27A and the second reflection surface 27B are each formed of a portion of the reflection surface 27, and the first light exiting surface 28A and the second light exiting surface 28B are each formed of a portion of the light exiting surface 28.

In the present embodiment, the angle of the reflection surface 27 with respect to the light incident surface 26 is so set that the reflection surface 27 totally reflects the excitation light E incident via the light incident surface 26.

For example, assuming that the largest angle of radiation of the excitation light E outputted from each of the laser light emitters 22 is about 70°, a first angle between the light incident surface 26 and the light exiting surface 28 is set, for example, at 60°, and a second angle between the reflection surface 27 and the light exiting surface 28 is set, for example, at 40°. That is, in the prism member 25, the first and second angles are both acute angles.

The first and second angles are specified by the angle at which the light incident surface 26 and the light exiting surface 28 intersect with each other and the angle at which the reflection surface 27 and the light exiting surface 28 intersect with each other, respectively, in the cross-section taken along a plane containing the center axis 25C of the prism member 25, as shown in FIG. 4.

Since the prism member 25 in the present embodiment has the light incident surface 26 including the first conical surface M1 and the reflection surface 27 including the second conical surface M2, the light incident surface 26 and the reflection surface 27 each have a continuous shape along a circumference around the center axis 25C, as shown in FIG. 3.

The first optical layer 31 is provided at the light incident surface 26. The first optical layer 31 is formed, for example, of a dichroic mirror, transmits the excitation light E, and reflects the fluorescence YL.

The second optical layer 32 is provided at the light exiting surface 28. The second optical layer 32 is formed, for example, of an AR coating and suppresses reflection of light incident on the light exiting surface 28.

The process in which the excitation light E outputted from the laser light emitters 22 enters the wavelength converter 24 via the prism member 25 will be described below. Since the excitation light E outputted from the laser light emitters 22 behaves in the same manner, the behavior of the excitation light E outputted from the first laser light emitter 22a will be described below by way of example.

The first laser light emitter 22a outputs the excitation light E toward the first light incident surface 26A of the prism member 25. The first laser light emitter 22a outputs the excitation light E along the front surface 210 of the base 21. The first laser light emitter 22a outputs the excitation light E along the front surface 240a of the wavelength converter 24, which a surface is parallel to the front surface 210 of the base 21.

The excitation light E passes through the first optical layer 31 provided at the first light incident surface 26A and enters the prism member 25 via the first light incident surface 26A. The excitation light E is refracted when entering the prism member 25 via the first light incident surface 26A, so that the angle of radiation of the excitation light E is narrowed. The prism member 25 can therefore efficiently capture the excitation light E outputted at the large angle of radiation from the first laser light emitter 22a.

The excitation light E having entered the prism member 25 via the first light incident surface 26A is incident on the first reflection surface 27A. The optical path of the excitation light E reflected off the first reflection surface 27A is deflected toward the first light exiting surface 28A and incident on the first light exiting surface 28A.

Part of the excitation light E having entered the prism member 25 via the first light incident surface 26A directly exits via the first light exiting surface 28A in some cases without traveling via the first reflection surface 27A and enters the wavelength converter 24.

Part of the excitation light E having entered the prism member 25 via the first light incident surface 26A is incident in other cases on the region, of the first light exiting surface 28A, that does not face the wavelength converter 24. When the region that does not face the wavelength converter 24 absorbs light, the part of the excitation light E is lost.

In contrast, the present embodiment, in which the reflector 30 provided in the region, of the first light exiting surface 28A, that does not face the wavelength converter 24 causes the excitation light E to return into the prism member 25, allows an increase in the efficiency of utilization of the excitation light E.

In the present embodiment, the air layer A is provided in the gap S between the wavelength converter 24 and the prism member 25. That is, the air layer A is provided between the first light exiting surface 28A of the prism member 25 and the wavelength converter 24. Therefore, when the excitation light E exits via the first light exiting surface 28A, there is a risk that some components of the excitation light E are totally reflected off the first light exiting surface 28A and do not enter the wavelength converter 24.

In contrast, the prism member 25 in the present embodiment has the second optical layer 32 provided at the first light exiting surface 28A to suppress the reflection of the excitation light E at the interface between the first light exiting surface 28A and the air layer A. The prism member 25 thus allows the excitation light E to efficiently exit via the first light exiting surface 28A toward the wavelength converter 24.

As described above, the prism member 25 allows the excitation light E incident via the first light incident surface 26A to be reflected off the first reflection surface 27A toward the first light exiting surface 28A and exit toward the wavelength converter 24 via the first light exiting surface 28A, which intersects the first light incident surface 26A and the first reflection surface 27A. That is, the prism member 25 can change the optical path of the excitation light E outputted from the first laser light emitter 22a along the front surface 240a of the wavelength converter 24 to cause the excitation light E to enter the wavelength converter 24 at a small angle of incidence.

The wavelength converter 24 causes the fluorescence YL, into which the excitation light E has been converted in terms of wavelength, and part of the excitation light E to exit via the front surface 240a of the wavelength conversion layer 240. The fluorescence YL and part of the excitation light E having exited out of the wavelength converter 24 are incident at least on the first light exiting surface 28A of the prism member 25. The fluorescence YL emitted in the Lambertian scheme has an angle of radiation larger than that of the excitation light E, and is therefore incident not only on the first light exiting surface 28A but also on the entire light exiting surface 28.

In the present embodiment, in which the air layer A is provided between the wavelength converter 24 and the light exiting surface 28 of the prism member 25, the fluorescence YL emitted in the Lambertian scheme is refracted at the interface between the air layer A and the light exiting surface 28 and passes through the prism member 25 with the angle of radiation of the fluorescence YL narrowed. Part of the excitation light E having exited via the front surface 240a of the wavelength conversion layer 240 is also refracted at the interface between the air layer A and the light exiting surface 28 and passes through the prism member 25 with the angle of radiation of the part of excitation light E narrowed.

In the present embodiment, the second optical layer 32 provided at the light exiting surface 28 suppresses the reflection of the fluorescence YL and the excitation light E at the interface between the light exiting surface 28 and the air layer A. The prism member 25 can therefore efficiently capture via the light exiting surface 28 the fluorescence YL and the part of the excitation light E having exited out of the wavelength converter 24.

The fluorescence YL and the part of the excitation light E thus captured into the prism member 25 are incident on the reflection surface 27. The fluorescence YL and the part of the excitation light E passing through the reflection surface 27 exit as the white illumination light WL out of the prism member 25.

Out of the fluorescence YL captured into the prism member 25, the components having exited at large angles of radiance are incident on the light incident surface 26. At this point, the fluorescence YL is reflected off the first optical layer 31 provided at the light incident surface 26, is therefore caused to return into the prism member 25, passes via the reflection surface 27, and exits out of the prism member 25.

The thus configured prism member 25 in the present embodiment allows the fluorescence YL having exited out of the wavelength converter 24 to be extracted via the reflection surface 27. That is, in the plan view, the prism member 25 allows the fluorescence YL to exit via the region where the reflection surface 27 is provided.

The light source apparatus 20 according to the present embodiment can output the fluorescence YL with the angle of radiation thereof restricted by the prism member 25. The fluorescence YL outputted from the light source apparatus 20 is therefore satisfactorily captured by the pickup system 34.

The light source apparatus 20 according to the present embodiment described above provides the following effects.

The light source apparatus 20 according to the present embodiment includes the first laser light emitter 22a, which outputs the excitation light E, the wavelength converter 24, which converts the excitation light E into the fluorescence YL having the yellow wavelength band, the base 21, which includes the first support part 21a, which supports the first laser light emitter 22a, and the second support part 21b, which supports the wavelength converter 24, and the prism member 25, which is disposed in the optical path of the excitation light E between the first laser light emitter 22a and the wavelength converter 24 and guides the excitation light E outputted from the first laser light emitter 22a to the wavelength converter 24. The prism member 25 has the first light incident surface 26A, which faces the first laser light emitter 22a and on which the excitation light E outputted from the first laser light emitter 22a is incident, the first reflection surface 27A, which reflects the excitation light E incident via the first light incident surface 26A and deflects the optical path of the excitation light E, and the first light exiting surface 28A, which faces the wavelength converter 24 and via which the excitation light E reflected off the first reflecting surface 27A exits toward the wavelength converter 24. The first light incident surface 26A, the first reflection surface 27A, and the first light exiting surface 28A intersect with each other.

The light source apparatus 20 according to the present embodiment, in which the prism member 25 changes the optical path of the excitation light E outputted from the first laser light emitter 22a, allows the excitation light E to enter the wavelength converter 24 at a small angle of incidence.

The present inventors conducted a simulation that verifies the effects of the prism member 25. In the present simulation, the angle of incidence of the excitation light E with respect to the front surface 240a of the wavelength converter 24 (wavelength conversion layer 240) was verified for the light source apparatus 20 according to the present embodiment, which was provided with the prism member 25, and a light source apparatus provided with no prism member 25.

The result of the present simulation ascertained that the light source apparatus 20 according to the present embodiment caused the excitation light E to be incident on the front surface 240*a* of the wavelength converter 24 at an angle of incidence ranging from 0° to 50°. The angle of incidence of 0° means that the excitation light E is incident on the front surface 240*a* in the direction perpendicular thereto.

The result of the present simulation further ascertained that the light source apparatus according to Comparative Example provided with no prism member 25 caused the excitation light E to be incident on the front surface 240*a* of the wavelength converter 24 at an angle of incidence of ranging from 50° to 80°. It was further ascertained that when the prism member 25 was not provided, the excitation light E was obliquely incident at a large angle of incidence on the front surface 240*a* of the wavelength converter 24.

The larger the angle of incidence of the excitation light E with respect to the wavelength converter 24, the more difficult for the excitation light E to enter the wavelength converter 24 because the excitation light E is reflected off the front surface 240*a* of the wavelength converter 24, resulting in a decrease in the fluorescence conversion efficiency of the wavelength converter 24. Furthermore, since it is difficult to design an antireflection film, such as an AR coating, when the angle of incidence is large, it is also difficult to improve the fluorescence conversion efficiency by using an antireflection film.

Therefore, in the light source apparatus according to Comparative Example, the fluorescence conversion efficiency decreases due to an increase in the components of the excitation light E that are reflected off the front surface 240*a* of the wavelength converter 24, so that bright fluorescence YL cannot be generated.

In contrast, the light source apparatus 20 according to the present embodiment, in which the prism member 25 allows the excitation light E to be incident at a small angle on the wavelength converter 24, allows the excitation light E to efficiently enter the wavelength converter 24. The simulation shows that the light source apparatus 20 according to the present embodiment can increase the amount of excitation light E that enters the wavelength converter 24 by up to about 3.5 times as compared with the light source apparatus according to Comparative Example, which does not use the prism member 25.

The light source apparatus 20 according to the present embodiment, in which the prism member 25 changes the optical path of the excitation light E outputted from the first laser light emitter 22*a*, therefore allows the excitation light E to efficiently enter the wavelength converter 24 to generate bright fluorescence YL as the illumination light WL.

In the light source apparatus 20 according to the present embodiment, the angle between the first light incident surface 26A and the first light exiting surface 28A is an acute angle.

The prism member 25 having the angular relationship described above allows the optical path of the excitation light E to be changed and the excitation light E to efficiently enter the wavelength converter 24, as described above.

In the light source apparatus 20 according to the present embodiment, the wavelength converter 24 includes the wavelength conversion layer 240, which converts the excitation light E in terms of wavelength into the fluorescence YL, and the reflection layer 241, which is provided at the side across the wavelength conversion layer 240 from the prism member 25, and causes the fluorescence YL to exit toward the prism member 25.

The configuration described above allows the fluorescence YL having exited out of the reflective wavelength converter 24 to enter the prism member 25.

In the light source apparatus 20 according to the present embodiment, the prism member 25 further includes the first optical layer 31, which is provided at the first light incident surface 26A, transmits the excitation light E, and reflects the fluorescence YL.

The configuration described above allows the fluorescence YL having exited out of the wavelength converter 24 and incident on the first light incident surface 26A to return into the prism member 25. The prism member 25, which thus causes the fluorescence YL to exit via the region where the reflection surface 27 is provided, allows the fluorescence YL to exit with the angle of radiation thereof restricted.

In the light source apparatus 20 according to the present embodiment, the air layer A is provided between the first light exiting surface 28A and the wavelength converter 24. In the present embodiment, the prism member 25 further includes the second optical layer 32, which is provided at the first light exiting surface 28A and suppresses reflection of light incident thereon.

According to the configuration described above, the fluorescence YL emitted in the Lambertian scheme is refracted at the interface between the air layer A and the light exiting surface 28, whereby the prism member 25 can capture the fluorescence YL with the angle of radiation thereof reduced. Furthermore, providing the second optical layer 32 suppresses reflection of the excitation light E at the interface between the first light exiting surface 28A and the air layer A, whereby the first light exiting surface 28A allows the excitation light E to efficiently exit toward the wavelength converter 24.

In the light source apparatus 20 according to the present embodiment, the base 21 further includes the third support part 21*c*, which supports the prism member 25. The prism member 25 is fixed to the third support part 21*c* via the reflector 30. The reflector 30 is provided in the region, of the first light exiting surface 28A, that does not face the wavelength converter 24.

According to the configuration described above, the reflector 30 allows the excitation light E to return into the prism member 25, whereby the efficiency of utilization of the excitation light E can be increased.

In the light source apparatus 20 according to the present embodiment, the second support part 21*b* is the recess 213, which is formed at a position, in the base 21, where the recess 213 overlaps with a portion of the third support part 21*c* in the plan view.

According to the configuration described above, the prism member 25, the laser light emitters 22, and the wavelength converter 24 can be supported by the base 21 in a predetermined positional relationship.

In the light source apparatus 20 according to the present embodiment, the first laser light emitter 22*a* outputs the excitation light E along the front surface 240*a*, of the wavelength converter 24, on which the excitation light E is incident.

The fluorescence conversion efficiency is likely to lower by the largest amount when the excitation light E is outputted along the front surface 240*a*. The present embodiment can therefore emphasize by a greater degree the effect provided by changing the optical path of the excitation light E via the prism member 25.

In the light source apparatus 20 according to the present embodiment, the prism member 25 is a single member in which the first portion 125A corresponding to the first laser light emitter 22a and the second portion 125B corresponding to the second laser light emitter 22b are integrated with each other.

According to the configuration described above, the prism member 25 is readily positioned with respect to the laser light emitters 22.

In the light source apparatus 20 according to the present embodiment, the prism member 25 has the light incident surface 26, which includes the first conical surface M1 having a vertex on the side across the prism member 25 from the wavelength converter 24, the reflection surface 27, which includes the second conical surface M2 located inside the first conical surface M1 and having a vertex on the side facing the base 21, and the light exiting surface 28, which faces the wavelength converter 24. The first light incident surface 26A and the second light incident surface 26B are each formed of a portion of the light incident surface 26, the first reflection surface 27A and the second reflection surface 27B are each formed of a portion of the reflection surface 27, and the first light exiting surface 28A and the second light exiting surface 28B are each formed of a portion of the light exiting surface 28.

According to the configuration described above, which uses the prism member 25 so shaped that the light incident surface 26 and the reflection surface 27 each have a continuous shape along a circumference around the center axis 25C, there is no need to dispose the laser light emitters 22 at equal intervals along a circumference around the center axis 25C of the prism member 25. The prism member 25 is therefore readily positioned with respect to the laser light emitters 22.

The projector 1 according to the present embodiment described above provides the following effects.

The projector 1 according to the present embodiment includes the light source apparatus 20, the light modulators 4B, 4G, and 4R, which modulate the blue light LB, the green light LG, and the red light LR from the light source apparatus 20 in accordance with image information to form image light, and the projection optical apparatus 6, which projects the image light described above.

The projector 1 according to the present embodiment, which includes the light source apparatus 20, which generates the bright fluorescence YL, can form and project a high-luminance image.

The present disclosure has been described with reference to the embodiment by way of example but is not necessarily limited to the embodiment described above, and a variety of changes can be made thereto to the extent that the changes do not depart from the intent of the present disclosure.

For example, the light source apparatus 20 according to the aforementioned embodiment has been described with reference to the case where the light incident surface 26 and the light exiting surface 28 of the prism member 25 are each formed of a portion of a conical surface. That is, the case where the light incident surface 26 and the light exiting surface 28 are each formed of a curved surface is presented by way of example, but the prism member 25 is not necessarily shaped as described above.

First Variation

Figure 5:
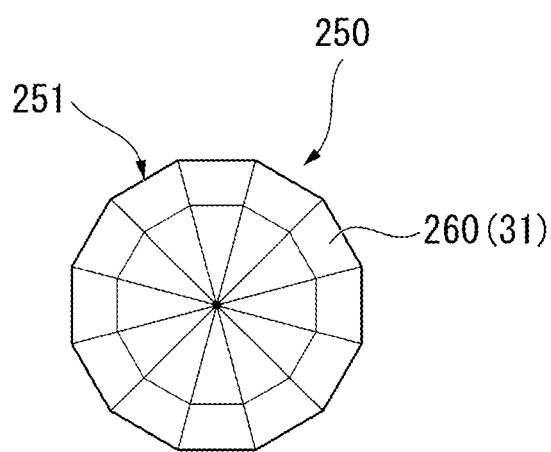
FIG. 5 is a plan view of a prism member according to a first variation.

FIG. 5 is a plan view of a prism member 250 according to a first variation.

The prism member 250 may be configured by integrally forming a plurality of quadrangular pyramidal portions 251 provided so as to face the respective laser light emitters 22, as shown in FIG. 5. The prism member 250 according to the present variation has a planar shape formed of a polygon. The prism member 250 according to the present variation, in which a light incident surface 260 is formed of a plurality of surfaces, allows the first optical layer 31 to be disposed at the light incident surface 260 to be readily formed.

Furthermore, the planar shape of the prism member 250 may be adjusted so as to correspond to the number of laser light emitters 22. For example, when the number of laser light emitters 22 is six, the prism member 250 has a hexagonal planar shape.

Furthermore, the light source apparatus 20 according to the aforementioned embodiment has been described with reference to the case where the air layer A is provided in the gap S between the wavelength converter 24 and the prism member 25, and the light exiting surface 28 of the prism member 25 and the wavelength converter 24 may instead be in contact with each other.

Second Variation

Figure 6:
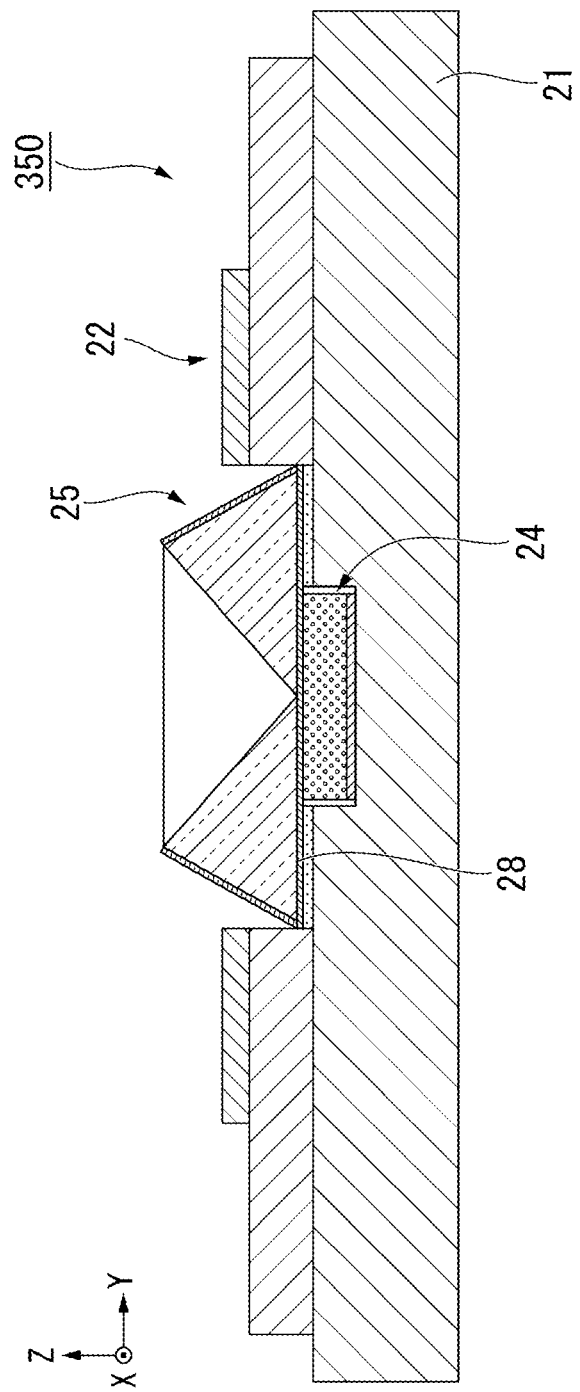
FIG. 6 is a cross-sectional view of the prism member according to a second variation.

FIG. 6 is a cross-sectional view of a light source apparatus 350 according to a second variation.

In the light source apparatus 350, the prism member 25 is in contact with the wavelength converter 24, as shown in FIG. 6. The configuration described above, in which total reflection at the interface with the air layer does not occur when the excitation light E exits via the light exiting surface 28 of the prism member 25, allows a greater amount of excitation light E to enter the wavelength converter 24.

As the prism member 25 in the embodiment described above, a single prism member with the plurality of portions 125 corresponding to the laser light emitters 22 integrated with each other has been presented by way of example, and the plurality of portions 125 including the first portion 125A and the second portion 125B may instead be portions separate from one another.

The light source apparatuses according to the aforementioned embodiment and variations have been described with reference to the case where the plurality of laser light emitters 22 are provided, but the number of laser light emitters 22 is not limited to a specific number, and the laser light emitters 22 may be formed only of the first light emitter 22a.

In the embodiment described above, the projector 1 including the three light modulators 4R, 4G, and 4B has been presented byway of example, and the present disclosure is also applicable to a projector that displays color video images via one light modulator. Furthermore, the light modulators are not limited to the liquid crystal panels described above and can instead, for example, be digital mirror devices.

In the embodiment described above, the light source apparatus according to the present disclosure is used in a projector by way of example, but not necessarily. The light source apparatus according to the present disclosure may be used as a lighting apparatus, such as a headlight of an automobile.

A light source apparatus according to an aspect of the present disclosure may have the configuration below.

The light source apparatus according to the aspect of the present disclosure includes a first laser light emitter that outputs first light having a first wavelength band, a wavelength converter that converts the first light into second light having a second wavelength band different from the first wavelength band, a base including a first support part that supports the first laser light emitter and a second support part that supports the wavelength converter, and a first optical element that is disposed in the optical path of the first light between the first laser light emitter and the wavelength converter and guides the first light outputted from the first laser light emitter to the wavelength converter. The first optical element has a first light incident surface which faces the first laser light emitter and on which the first light outputted from the first laser light emitter is incident, a first reflection surface that reflects the first light incident via the first light incident surface and deflects the optical path of the first light, and a first light exiting surface which faces the wavelength converter and via which the first light reflected off the first reflection surface exits toward the wavelength converter. The first light incident surface, the first reflection surface, and the first light exiting surface intersect with each other.

In the light source apparatus according to the aspect of the present disclosure, the angle between the first light incident surface and the first light exiting surface may be an acute angle.

In the light source apparatus according to the aspect of the present disclosure, the wavelength converter may include a wavelength conversion layer that converts the first light into the second light, and a reflection layer provided at the side across the wavelength conversion layer from the first optical element, and the wavelength converter may cause the second light to exit toward the first optical element.

In the light source apparatus according to the aspect of the present disclosure, the first optical element may further include a first optical layer that is provided at the first light incident surface, transmits the first light, and reflects the second light.

In the light source apparatus according to the aspect of the present disclosure, the first light exiting surface and the wavelength converter may be in contact with each other.

In the light source apparatus according to the aspect of the present disclosure, an air layer may be provided between the first light exiting surface and the wavelength converter.

In the light source apparatus according to the aspect of the present disclosure, the first optical element may further include a second optical layer that is provided at the first light exiting surface and suppresses reflection of light incident thereon.

The light source apparatus according to the aspect of the present disclosure may further include a reflector that reflects the first and second light. The base may further include a third support part that supports the first optical element. The first optical element may be fixed to the third support part via the reflector. The reflector may be provided in the region, of the first light exiting surface, that does not face the wavelength converter.

In the light source apparatus according to the aspect of the present disclosure, the second support part may be a recess that houses the wavelength converter, and the recess may be formed at a position, in the base, where the recess overlaps with a portion of the third support part in the plan view.

In the light source apparatus according to the aspect of the present disclosure, the wavelength converter may have a light incident surface on which the first light is incident, and the first laser light emitter may output the first light along the light incident surface of the wavelength converter.

The light source apparatus according to the aspect of the present disclosure may further include a second laser light emitter that outputs the first light, and a second optical element that is disposed in the optical path of the first light between the second laser light emitter and the wavelength converter and guides the first light outputted from the second laser light emitter to the wavelength converter, and the first and second optical elements may constitute a single prism member.

In the light source apparatus according to the aspect of the present disclosure, the second optical element may have a second light incident surface, a second reflection surface, and a second light exiting surface that intersect with each other. The prism member may have a first surface including a first conical surface having a vertex on the side across the prism member from the wavelength converter, a second surface including a second conical surface located inside the first conical surface and having a vertex on the side facing the base, and a third surface facing the wavelength converter. The first and second light incident surfaces may each be formed of a portion of the first surface. The first and second reflection surfaces may each be formed of a portion of the second surface. The first and second light exiting surfaces may each be formed of a portion of the third surface.

A projector according to another aspect of the present disclosure may have the configuration below.

The projector according to the other aspect of the present disclosure includes the light source apparatus according to the aspect of the present disclosure, a light modulator that modulates light from the light source apparatus, and a projection optical apparatus that projects the light modulated by the light modulator.

What is claimed is:

1. A light source apparatus comprising:
    a first laser light emitter configured to emit first light having a first wavelength band;
    a wavelength converter configured to convert the first light into second light having a second wavelength band different from the first wavelength band;
    a base including a first support part that supports the first laser light emitter and a second support part that supports the wavelength converter; and
    a first optical element disposed in an optical path of the first light between the first laser light emitter and the wavelength converter and configured to guide the first light emitted from the first laser light emitter to the wavelength converter,
    wherein the first optical element has
        a first light incident surface which faces the first laser light emitter and on which the first light emitted from the first laser light emitter is incident,
        a first reflection surface configured to reflect the first light emitted from the first light incident surface and deflect the optical path of the first light, and
        a first light exiting surface which faces the wavelength converter and via which the first light reflected off the first reflection surface exits toward the wavelength converter,
    the first light incident surface, the first reflection surface, and the first light exiting surface intersect with each other,
    the wavelength converter includes a wavelength conversion layer that converts the first light into the second light and a reflection layer provided at an opposite side to the first optical element with respect to the wavelength conversion layer, and
    the wavelength converter emits the second light toward the first optical element.

2. The light source apparatus according to claim 1, wherein an angle formed between the first light incident surface and the first light exiting surface is an acute angle.

3. The light source apparatus according to claim 1,
wherein the wavelength converter has a light incident surface on which the first light is incident, and
the first laser light emitter emits the first light along the light incident surface of the wavelength converter.

4. The light source apparatus according to claim 1,
wherein the first optical element further includes a first optical layer provided at the first light incident surface, the first optical layer being configured to transmit the first light and reflect the second light.

5. The light source apparatus according to claim 1,
wherein the first light exiting surface and the wavelength converter are in contact with each other.

6. The light source apparatus according to claim 1,
wherein an air layer is provided between the first light exiting surface and the wavelength converter.

7. The light source apparatus according to claim 6,
wherein the first optical element further includes a second optical layer provided at the first light exiting surface and configured to suppress reflection of light incident thereon.

8. A projector comprising:
the light source apparatus according to claim 1;
a light modulator configured to modulate light emitted from the light source apparatus; and
a projection optical apparatus configured to project the light modulated by the light modulator.

9. A light source apparatus, comprising:
a first laser light emitter configured to emit first light having a first wavelength band;
a wavelength converter configured to convert the first light into second light having a second wavelength band different from the first wavelength band;
a base including a first support part that supports the first laser light emitter and a second support part that supports the wavelength converter;
a first optical element disposed in an optical path of the first light between the first laser light emitter and the wavelength converter and configured to guide the first light emitted from the first laser light emitter to the wavelength converter; and
a reflector configured to reflect the first and second lights,
wherein the first optical element has
a first light incident surface which faces the first laser light emitter and on which the first light emitted from the first laser light emitter is incident,
a first reflection surface configured to reflect the first light emitted from the first light incident surface and deflect the optical path of the first light, and
a first light exiting surface which faces the wavelength converter and via which the first light reflected off the first reflection surface exits toward the wavelength converter,
the first light incident surface, the first reflection surface, and the first light exiting surface intersect with each other,
the base further includes a third support part that supports the first optical element,
the first optical element is fixed to the third support part via the reflector, and
the reflector is provided at the first light exiting surface in a region that does not face the wavelength converter.

10. The light source apparatus according to claim 9,
wherein the second support part is a recess that houses the wavelength converter, and
the recess is formed in the base at a position where the recess overlaps with a portion of the third support part in a plan view.

11. A projector comprising:
the light source apparatus according to claim 9;
a light modulator configured to modulate light emitted from the light source apparatus; and
a projection optical apparatus configured to project the light modulated by the light modulator.

12. A light source apparatus, comprising:
a first laser light emitter configured to emit first light having a first wavelength band;
a wavelength converter configured to convert the first light into second light having a second wavelength band different from the first wavelength band;
a base including a first support part that supports the first laser light emitter and a second support part that supports the wavelength converter; and
a first optical element disposed in an optical path of the first light between the first laser light emitter and the wavelength converter and configured to guide the first light emitted from the first laser light emitter to the wavelength converter;
a second laser light emitter configured to emit the first light; and
a second optical element disposed in an optical path of the first light between the second laser light emitter and the wavelength converter and configured to guide the first light emitted from the second laser light emitter to the wavelength converter,
wherein the first optical element has
a first light incident surface which faces the first laser light emitter and on which the first light emitted from the first laser light emitter is incident,
a first reflection surface configured to reflect the first light emitted from the first light incident surface and deflect the optical path of the first light, and
a first light exiting surface which faces the wavelength converter and via which the first light reflected off the first reflection surface exits toward the wavelength converter,
the first light incident surface, the first reflection surface, and the first light exiting surface intersect with each other, and
the first and second optical elements constitute a single prism member.

13. The light source apparatus according to claim 12,
wherein the second optical element has a second light incident surface, a second reflection surface, and a second light exiting surface that intersect with each other,
the prism member has
a first surface including a first conical surface having a vertex on an opposite side to the wavelength converter with respect to the prism member,
a second surface including a second conical surface which is located inside the first conical surface and which is having a vertex on a base side, and
a third surface facing the wavelength converter,
the first and second light incident surfaces are each formed of a portion of the first surface,
the first and second reflection surfaces are each formed of a portion of the second surface, and
the first and second light exiting surfaces are each formed of a portion of the third surface.

14. A projector comprising:
the light source apparatus according to claim 12;
a light modulator configured to modulate light emitted from the light source apparatus; and
a projection optical apparatus configured to project the light modulated by the light modulator.

15. A light source apparatus comprising:
a first laser light emitter configured to emit first light having a first wavelength band;
a wavelength converter configured to convert the first light into second light having a second wavelength band different from the first wavelength band;
a base including a first support part that supports the first laser light emitter and a second support part that supports the wavelength converter; and
a first optical element disposed in an optical path of the first light between the first laser light emitter and the wavelength converter and configured to guide the first light emitted from the first laser light emitter to the wavelength converter,
wherein the first optical element has
　a first light incident surface which faces the first laser light emitter and on which the first light emitted from the first laser light emitter is incident,
　a first reflection surface configured to reflect the first light emitted from the first light incident surface and deflect the optical path of the first light, and
　a first light exiting surface which faces the wavelength converter and via which the first light reflected off the first reflection surface exits toward the wavelength converter,
the first light incident surface, the first reflection surface, and the first light exiting surface intersect with each other, and
the first light exiting surface and the wavelength converter are in contact with each other.

16. A projector comprising:
the light source apparatus according to claim 15;
a light modulator configured to modulate light emitted from the light source apparatus; and
a projection optical apparatus configured to project the light modulated by the light modulator.

17. A light source apparatus comprising:
a first laser light emitter configured to emit first light having a first wavelength band;
a wavelength converter configured to convert the first light into second light having a second wavelength band different from the first wavelength band;
a base including a first support part that supports the first laser light emitter and a second support part that supports the wavelength converter; and
a first optical element disposed in an optical path of the first light between the first laser light emitter and the wavelength converter and configured to guide the first light emitted from the first laser light emitter to the wavelength converter,
wherein the first optical element has
　a first light incident surface which faces the first laser light emitter and on which the first light emitted from the first laser light emitter is incident,
　a first reflection surface configured to reflect the first light emitted from the first light incident surface and deflect the optical path of the first light, and
　a first light exiting surface which faces the wavelength converter and via which the first light reflected off the first reflection surface exits toward the wavelength converter,
the first light incident surface, the first reflection surface, and the first light exiting surface intersect with each other,
an air layer is provided between the first light exiting surface and the wavelength converter, and
the first optical element further includes a second optical layer provided at the first light exiting surface and configured to suppress reflection of light incident thereon.

18. A projector comprising:
the light source apparatus according to claim 17;
a light modulator configured to modulate light emitted from the light source apparatus; and
a projection optical apparatus configured to project the light modulated by the light modulator.

* * * * *